(12) United States Patent
Roy et al.

(10) Patent No.: US 11,874,751 B2
(45) Date of Patent: Jan. 16, 2024

(54) OPERATING A DATA CENTER

(71) Applicant: International Business Machines Corporation, Armonk, NY (US)

(72) Inventors: Huiyan Roy, Altensteig (DE); Daniel Martin, Leinfelden-Echterdingen (DE); Dennis Butterstein, Stuttgart (DE); Kevin Pelletier, Saint-Genis Pouilly (FR); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 17/546,870

(22) Filed: Dec. 9, 2021

(65) Prior Publication Data
US 2023/0185684 A1    Jun. 15, 2023

(51) Int. Cl.
*G06F 11/20* (2006.01)
*G06F 16/18* (2019.01)

(52) U.S. Cl.
CPC ...... *G06F 11/2094* (2013.01); *G06F 16/1865* (2019.01); *G06F 2201/85* (2013.01)

(58) Field of Classification Search
None
See application file for complete search history.

(56) References Cited

U.S. PATENT DOCUMENTS

| | | | |
|---|---|---|---|
| 11,182,260 B1 | 11/2021 | Beier | |
| 11,226,878 B1* | 1/2022 | Beier | G06F 16/275 |
| 2018/0203617 A1 | 7/2018 | Lee | |
| 2019/0294512 A1 | 9/2019 | Chen | |
| 2019/0347342 A1* | 11/2019 | Kameswaran | G06F 11/3409 |
| 2019/0391740 A1 | 12/2019 | Cheng | |

(Continued)

FOREIGN PATENT DOCUMENTS

| | | |
|---|---|---|
| EP | 2864885 B1 | 5/2017 |
| KR | 102307371 B1 | 10/2021 |

OTHER PUBLICATIONS

"Conventions: Load Balance & Failover", RavenDB, Printed Aug. 8, 2021, 3 pages, <https://ravendb.net/docs/article-page/4.2/csharp/client-api/configuration/load-balance-and-failover>.

(Continued)

*Primary Examiner* — Thu N Nguyen
(74) *Attorney, Agent, or Firm* — Edward J. Wixted, III

(57) ABSTRACT

In an approach, a primary data center is provided including primary source and primary target database systems, where a function is activated causing the primary target database system to: include a copy of data and receive analysis queries from the primary source database system; and execute the analysis queries on data. A processor, in response to detecting a failure in the primary source database system: offloads queries intended for the primary source database system to a secondary source database system of a secondary data center also including a secondary target database system and a copy of data, where the function is deactivated. A processor, responsive to the primary target database system being available: receives analysis queries, processed by the secondary source database system, of the offloaded queries; and copies data to the secondary target database system. A processor causes the function to be activated in the secondary data center.

20 Claims, 4 Drawing Sheets

(56) References Cited

U.S. PATENT DOCUMENTS

2020/0293512 A1    9/2020  Parikh
2021/0271660 A1*   9/2021  Jo .......................... G06F 16/245

OTHER PUBLICATIONS

"Method for Replicating DDL Statements in Database-Accelerator Environments", An IP.com Prior Art Database Technical Disclosure, Disclosed Anonymously, IP.com No. IPCOM000265569D, IP.com Electronic Publication Date: Apr. 27, 2021, 3 pages.
International Searching Authority, "Notification of Transmittal of the International Search Report and the Written Opinion of the International Searching Authority, or the Declaration", International application No. PCT/EP2022/084718, International Filing Date Dec. 7, 2022, dated Mar. 17, 2023, 12 pages.

* cited by examiner

OPERATING A DATA CENTER

BACKGROUND

The present invention relates to digital computer systems, and more specifically, to an approach for operating a data center.

Replication is a process of maintaining a defined set of data in more than one location. It may involve copying designated changes from one source location to a target location, and synchronizing the data in both locations. The source and target can be in logical servers that are on the same machine or on different machines in a distributed network. Several approaches exist for processing and moving data from one system to another.

U.S. Patent Application Publication 2019/0391740 A1 describes a "computing system includes a first storage unit at a first computing site. The first storage unit stores units of work data and data synchronously replicated from a first server cluster of a second computing site. The computing system further includes a second server cluster at the first computing site, the second server cluster is a proxy node of the first server cluster. The computing system further includes a second storage unit at the first computing site, the second storage unit stores the units of work data and data from the first storage unit asynchronously into the second storage unit. The computing system further includes a third server cluster at the first computing site, the third server cluster processes the units of work data asynchronously replicated into the second storage unit." (Abstract, U.S. Patent Application Publication 2019/0391740 A1). However, such an approach does not deal with the recovery of data in the unique environment described by embodiments of the present invention when synchronization of data happens between periphery appliances.

SUMMARY

Various embodiments provide a method for operating a data center, computer system and computer program product as described by the subject matter of the independent claims. Advantageous embodiments are described in the dependent claims. Embodiments of the present invention can be freely combined with each other if they are not mutually exclusive.

In one aspect, embodiments of the invention relate to a computer-implemented method that includes providing a primary data center, the primary data center including a primary source database system and a primary target database system, where a function is activated in the primary data center causing the primary target database system to: include a copy of data of the primary source database system; receive analysis queries from the primary source database system; and execute the analysis queries on the data. In response to detecting a failure in the primary source database system: a processor offloads queries intended for the primary source database system to a secondary source database system, the secondary source database system of a secondary data center further including a secondary target database system, the secondary source database system including a copy of the data, where the function is deactivated in the secondary data center. A processor, responsive to the primary target database system being available: receives, by the primary target database system, analysis queries, processed by the secondary source database system, of the offloaded queries; and copies, by the primary target database system, the data to the secondary target database system. A processor causes the function to be activated in the secondary data center. Such an approach has the advantage of minimizing downtime and reducing or eliminating manual intervention to bring back replication functionality.

In another aspect, embodiments of the invention relate to a computer program product that includes one or more computer readable storage media, and program instructions collectively stored on the one or more computer readable storage media, the program instructions including program instructions to provide a primary data center, the primary data center including a primary source database system and a primary target database system, where a function is activated in the primary data center causing the primary target database system to: include a copy of data of the primary source database system; receive analysis queries from the primary source database system; and execute the analysis queries on the data. Further including program instructions, in response to detecting a failure in the primary source database system, to: offload queries intended for the primary source database system to a secondary source database system, the secondary source database system of a secondary data center further including a secondary target database system, the secondary source database system including a copy of the data, where the function is deactivated in the secondary data center. Further including program instructions, responsive to the primary target database system being available, to: receive, by the primary target database system, analysis queries, processed by the secondary source database system, of the offloaded queries; and copy, by the primary target database system, the data to the secondary target database system. Further including program instructions to cause the function to be activated in the secondary data center. Such an approach has the advantage of minimizing downtime and reducing or eliminating manual intervention to bring back replication functionality.

In another aspect, embodiments of the invention relate to a computer system that includes one or more computer processors, one or more computer readable storage media, and program instructions collectively stored on the one or more computer readable storage media for execution by at least one of the one or more computer processors, the program instructions including program instructions to provide a primary data center, the primary data center including a primary source database system and a primary target database system, where a function is activated in the primary data center causing the primary target database system to: include a copy of data of the primary source database system; receive analysis queries from the primary source database system; and execute the analysis queries on the data. Further including program instructions, in response to detecting a failure in the primary source database system, to: offload queries intended for the primary source database system to a secondary source database system, the secondary source database system of a secondary data center further including a secondary target database system, the secondary source database system including a copy of the data, where the function is deactivated in the secondary data center. Further including program instructions, responsive to the primary target database system being available, to: receive, by the primary target database system, analysis queries, processed by the secondary source database system, of the offloaded queries; and copy, by the primary target database system, the data to the secondary target database system. Further including program instructions to cause the function to be activated in the secondary data center. Such an approach has the advantage of minimizing downtime and reducing or eliminating manual intervention to bring back replication functionality.

Embodiments of the invention may further include sending, from the primary target database system to the secondary target database system, log positions until a time when the data was replicated from the primary source database system to the primary target database system, wherein the log positions are used for replicating further changes that occurred at the secondary source database system after the failure. Such an approach allows log positions to be used for replicating further that occurred after the failure.

BRIEF DESCRIPTION OF THE DRAWINGS

In the following embodiments of the invention are explained in greater detail, by way of example only, making reference to the drawings in which.

DETAILED DESCRIPTION

Figure 1:
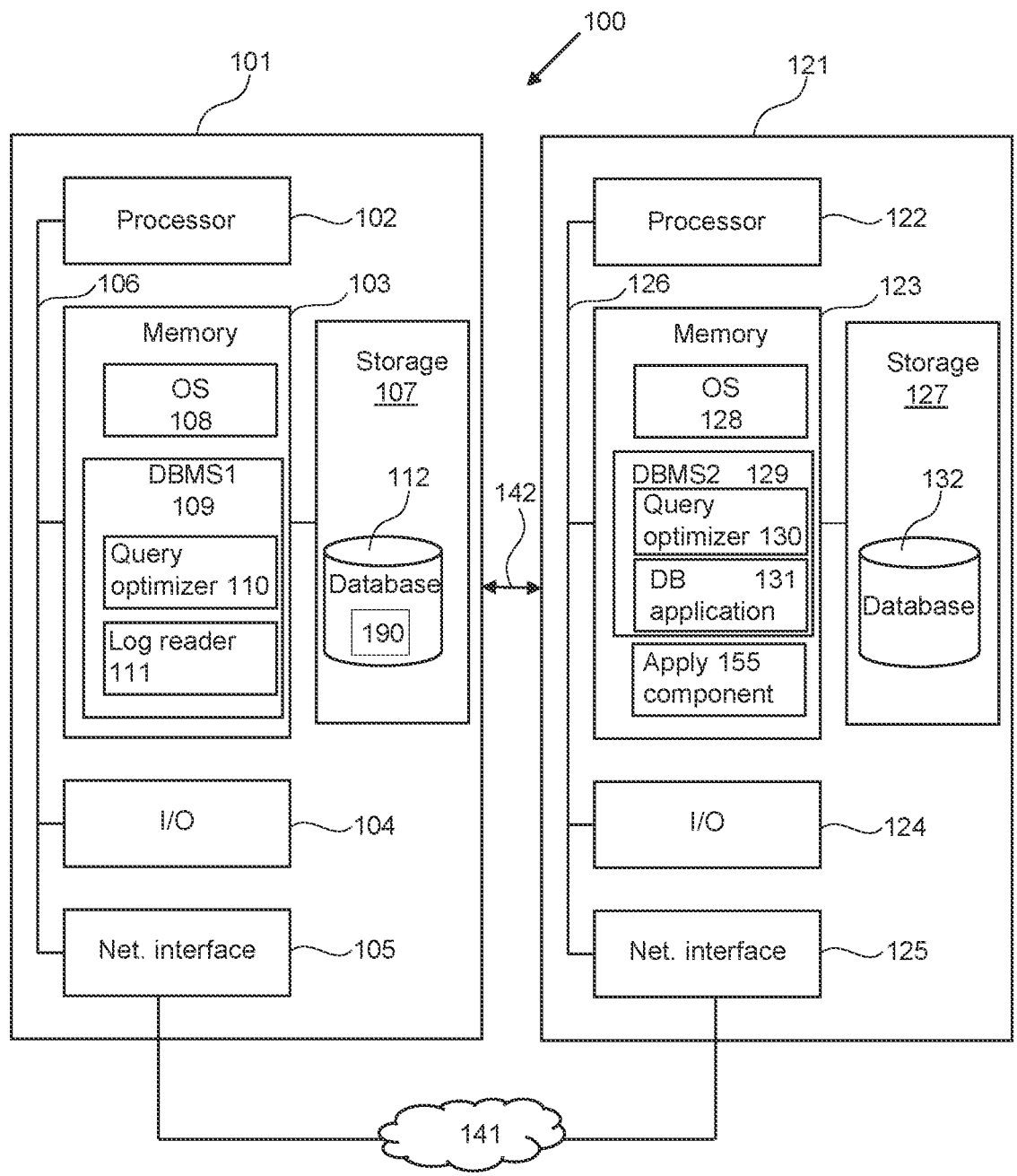
FIG. 1 depicts a data center, in accordance with an embodiment of the invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A data center may be a data processing system. As used herein, data center may refer to a primary data center or a secondary data center. The source database system and the target database system of the data center may initially comprise a same dataset. After, the dataset may change at the source database system. The data center may be enabled to replicate the change from the source database system to the target database system so that the target database system may apply the same change(s) and thus get the same content as in the source database system. The data center may enable said replication by, for example, activating a replication function. That is, if the replication function is deactivated, the data center may not replicate the changes that occur at the source database system. The data center may enable a hybrid transaction and analytic processing (HTAP) environment for processing data of a database (e.g., Db2) using different types of queries. The source database system of the data center may enable transactional queries and the target database system (also referred to as accelerator) may enable execution of complex queries, e.g., a complex query may comprise expensive SQL operations, such as grouping and aggregation. The source database system may identify and forward said complex queries to the target database system. This execution of the complex queries may be enabled by activating an acceleration function in the data center. That is, if the acceleration function is deactivated, the source database system may not forward the complex queries to the target database system and thus may not be executed. The data center may enable to activate and deactivate both functions. For example, a replication-acceleration function may comprise the replication function and the acceleration function so that activating the replication-acceleration function comprises activating the replication function and the acceleration function and deactivating the replication-acceleration function comprises deactivating the replication function and the acceleration function. The data center is said to be active if the replication-acceleration function is activated.

The source database system may, for example, be a transactional engine. The target database system may, for example, be an analytical engine. In a specific combination as implemented by the data center "IBM Db2 Analytics Accelerator for z/OS", the source database system may be an OLTP-optimized relational DBMS (row-major organized storage) and the target database system may be an analytics-optimized relational DBMS (column-major organized storage). However, the present subject matter is not limited to the combination online transaction processing (OLTP)/online analytical processing (OLAP), as other combinations may be OLTP/graph store, or OLAP/key-value store. The source database system may have fewer processing resources compared to the target database system. In the source database system, the emphasis may be on fast processing, because the source databases may be read, written, and updated frequently. The target database system may enable complex queries to large amounts of data and thus may have more processing resources compared to the source database system. The combination of relational database systems may advantageously be used to implement various types of queries such as the HTAP queries. The system may provide optimal response times on the same data for both, analytical and transactional-type queries without having to copy data or transform it into a schema best suited for the use-case.

Following a failure of the primary data center, the present approach may provide an optimal disaster recovery approach to enable the recovery or continuation of the processing of data. The present subject matter may enable a reactive and proactive process in case the source database system of the primary center is damaged or put out of action by a sudden disaster. This may improve the Recovery Time Objective (RTO). RTO represents the amount of time an application can be down to not result in significant business damage. Indeed, the accelerator of the data center may run workloads of typically two types of applications: reporting application for enterprise internal usage and external customer applications that are client facing and revenue generating. Both types of applications may be high-priority applications and may require an extremely low RTO (near-zero RTO) due to the customer facing characteristic of it. This means a high recovery time may bring serious financial impact and dissatisfaction of their customers for the enterprises. To solve this, the present approach may use redundant systems and software. This may ensure high availability and prevent downtime and data loss to eliminate single points of failure. In particular, embodiments of the present approach provide the secondary data center which may be used as a fallback solution in case the primary data center fails. Embodiments of the present approach may be performed in case of a real disaster recovery situation or an annual disaster recovery test.

The combination of the primary and the secondary data centers may provide a passive standby system architecture because the secondary data center may be in passive and standby mode while the primary data center is in operation. Indeed, hardware and software are installed and ready to be used in the secondary data center, but not running or doing active works while the primary data center is in operation. The secondary data center may be activated only in a disaster/fail-over situation, and then replace the formerly active primary data center.

Embodiments of the present subject matter may further improve the disaster recovery approach by further reducing the recovery time, e.g., the present approach may reduce the duration between the time when the source database on the primary center is shut down and the secondary accelerator on the secondary center is operational for query acceleration. Embodiments of the present subject matter may enable a seamless take-over of the accelerated workload (e.g., SQL workload) and a continuously on-going replication of accelerator shadow tables under a disaster recovery situation. This may minimize the downtime of the accelerator to a near-zero RTO and may eliminate completely the manual intervention to bring back the replication functionality to normal during the disaster recovery situation. For example, embodiments of the present approach may prevent loading the data from the Db2 of the secondary data center onto the secondary accelerator using predefined stored procedures. This may be advantageous because the procedures may be limited to run in certain time windows to guarantee the successful recovery of the appliances and could be complex so that any error could directly affect the following procedures and extend the over-all down-time of the machines.

According to one embodiment, the approach further comprises setting the primary target database system to a read only mode before executing the analysis queries at the primary target database system. The primary target database system may be set to read-only mode to provide at least the query execution services. The primary target database system may be in read-only mode while copying the data from the primary target database system to the secondary target database system for making the secondary target database system ready for query acceleration. For example, the primary accelerator may be used as an interim for query acceleration until the secondary accelerator is fully caught-up and reloaded from the newly started Db2 at the secondary center. Using the read-only mode may lower the recovery-time significantly for query acceleration as the secondary accelerator may need to be resynced with all changes from the primary accelerator.

According to one embodiment, the approach further comprises receiving at the secondary target database system log positions until when data was replicated from the primary source database system to the primary target database system, and using the log positions for replicating further changes that occurred at the secondary source database system after the failure is occurred.

According to one embodiment, the failure is a failure of a disk subsystem of the primary source database system. The failure may cause a partial or total shutdown of the at least part (e.g., storage) of the primary source database system.

According to one embodiment, the primary source database system is configured to actively mirror a disk subsystem of the primary source database system to a disk subsystem of the secondary source database system such that the secondary source database system comprises the copy of the most recent source data.

According to one embodiment, the copying is performed in parallel or concurrently to executing the analysis queries. This may further reduce the time of making the second accelerator ready for query acceleration compared to the case where the copy is performed after the analysis queries are executed.

FIG. 1 is a block diagram for a data center 100 suited in accordance with an example of the present subject matter. The data center 100 may, for example, comprise IBM Db2 Analytics Accelerator for z/OS (IDAA). The data center 100 comprises a source database system 101 connected to a target database system 121. The source database system 101 may, for example, comprise IBM Db2 for z/OS. The target database system 121 may, for example, comprise IBM Db2 Warehouse (Db2 LUW).

Source database system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may comprise a source database 112. The source database 112 may, for example, comprise a source table 190. The source table 190 may comprise a set of attributes (columns) named $att_1, \ldots att_n$.

Memory 103 may include one or more separate programs e.g., database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a log reader 111 and a query optimizer 110. The log reader 111 may read log records 180 of a transaction recovery log (not shown) of the source database system 101 and provide changed records to the target database system 121. The log reader 111 may read log records from the recovery log, extract relevant modification or change information (inserts/updates/deletes targeting tables in replication). Extracted information may be transmitted (e.g., as a request for application of the change) to target database system 121. The query optimizer 110 may be configured for generating or defining query plans for executing queries e.g., on source database 112.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs, e.g., database management system DBMS2 129 and apply component 155, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries e.g., on a target database 132. The apply component 155 may buffer log records sent from the log reader 111 and consolidate the changes into batches to improve efficiency when applying the modifications to the target database 132 via a bulk-load interface. This may enable to perform replication. The replication may be advantageous if it is able to keep up with the amount of modifications in order to keep the latency stable. If modifications surpass replication speed, latency may build up and might be too high. For that, the source database system 101 may be configured to perform a bulk load. The bulk load may load either entire table data or a set of partitions of a table at a given point in time. And data on the target database system 121 will reflect the source database system state at the time the load was executed.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1 as separate systems, the source and target database systems may belong to a single system, e.g., sharing a same memory and processor hardware, while each of the source and target database systems is associated with a respective DBMS and datasets, e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 2:
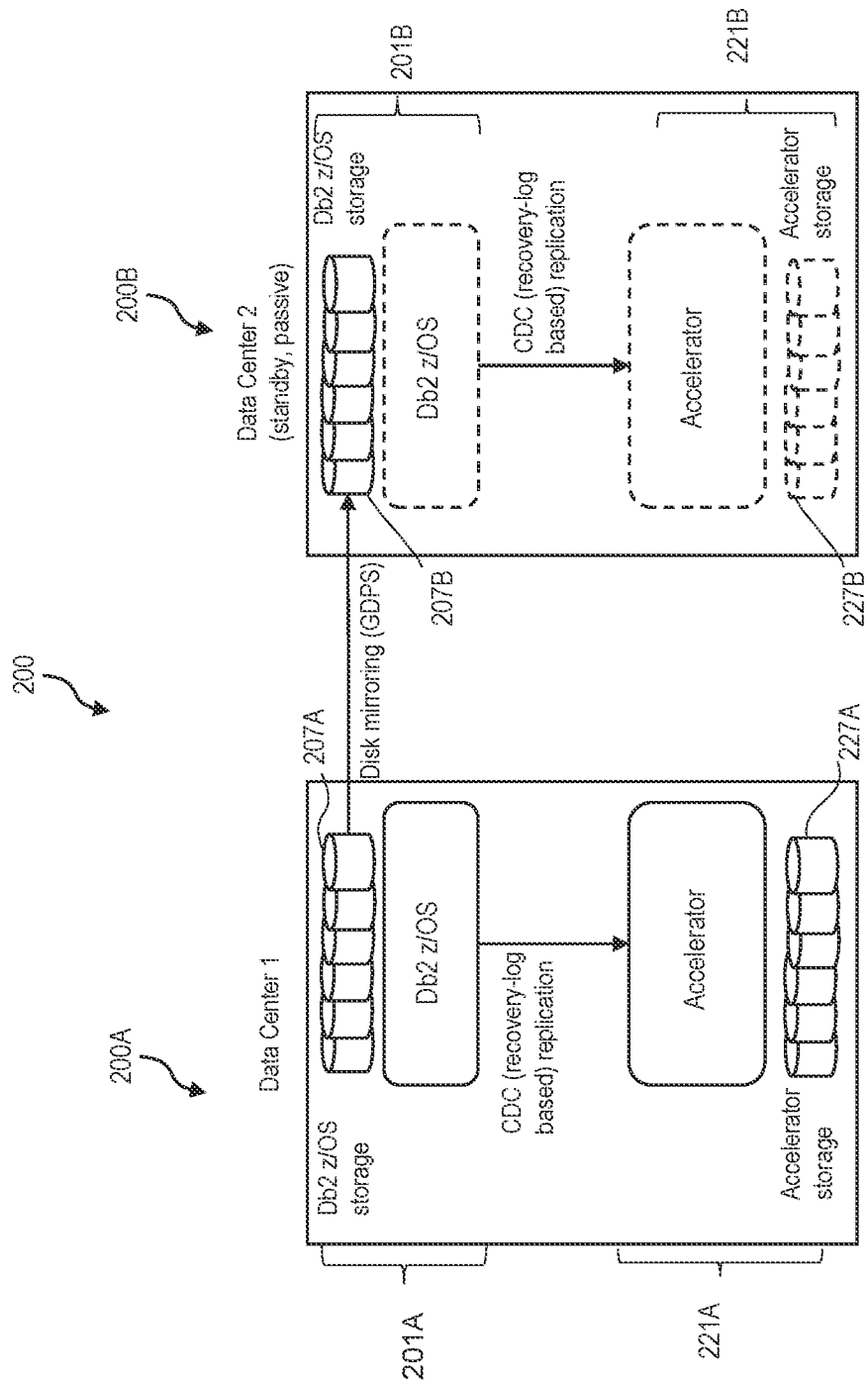
FIG. 2 depicts a computer system, in accordance with an embodiment of the invention.

FIG. 2 is a diagram of a computer system 200 according to an example of the present subject matter. The computer system 200 provides a passive-standby disaster recovery architecture. The computer system 200 comprises a primary data center 200A and a secondary data center 200B. Each of the primary center 200A and the secondary data center 200B may be the data center as described with reference to FIG. 1. The primary data center 200A comprises a primary source database system 201A and a primary target database system 221A (which may be named primary accelerator). The secondary data center 200B comprises a secondary source database system 201B and a secondary target database system 221B (which may be named disaster recovery (DR) accelerator).

The secondary data center 200B may be connected to the primary data center 200A through one or more connections. For example, the connections may comprise Fibre Channel Protocol (FCP) links which may link between disk subsystem pairs such as disk subsystems 207A and 207B and disk subsystems 227A and 227B. The FCP connection can be direct, through a switch, or through other supported distance solutions (for example, Dense Wave Division Multiplexer, DWDM, or channel extenders).

The primary source database system 201A comprises a storage 207A such as a disk subsystem e.g., for storing Db2. The secondary source database system 201B (which may be named DR Db2 z/OS system) comprises a storage 207B e.g., disk subsystem. As indicated in FIG. 2, the primary source database system 201A and the secondary source database system 201B may be configured for actively mirroring the storage 207A of the primary source database system 201A to the storage 207B of the secondary source database system 201B so that data in the storage 207B is in a consistent stat with the data in the storage 207A.

The primary target database system 221A comprises a storage 227A and the secondary target database system 221B comprises a storage 227B.

The primary data center 200A is active while the secondary data center 200B is not active. The primary data center 200A is active may mean that the data replication occurs between the primary source database system 201A and the primary target database system 221A and that the primary target database system 221A may execute complex queries received at the primary source database system 201A.

Since the primary data center 200A is active and the mirroring is also active, the data in the three storages 207A, 227A and 207B may be in a consistent state.

In the disaster case, the secondary data center 200B may be activated so that the secondary source database system 201B on the secondary data center 200B may boot, recover from current state on the disk subsystem 207B and propagate any changes to the attached DR accelerator 221B. For example, a query distribution unit (not shown) may activate the secondary data center in an enterprise data network and send all the query workload to the Db2/z logical partitions (LPARs) of the secondary data center 200B e.g., the query workload may be redistributed by activating certain network setup. The query distribution unit may be configured to receive queries for processing data of the primary data center 200A and forward the queries to the primary source database system 201A. In case of a failure of the primary source database system 201A (e.g., in the disaster case), the query distribution unit may be configured to advantageously perform the forwarding of the received queries to the secondary source database system 201B according to the present subject matter.

Figure 3:
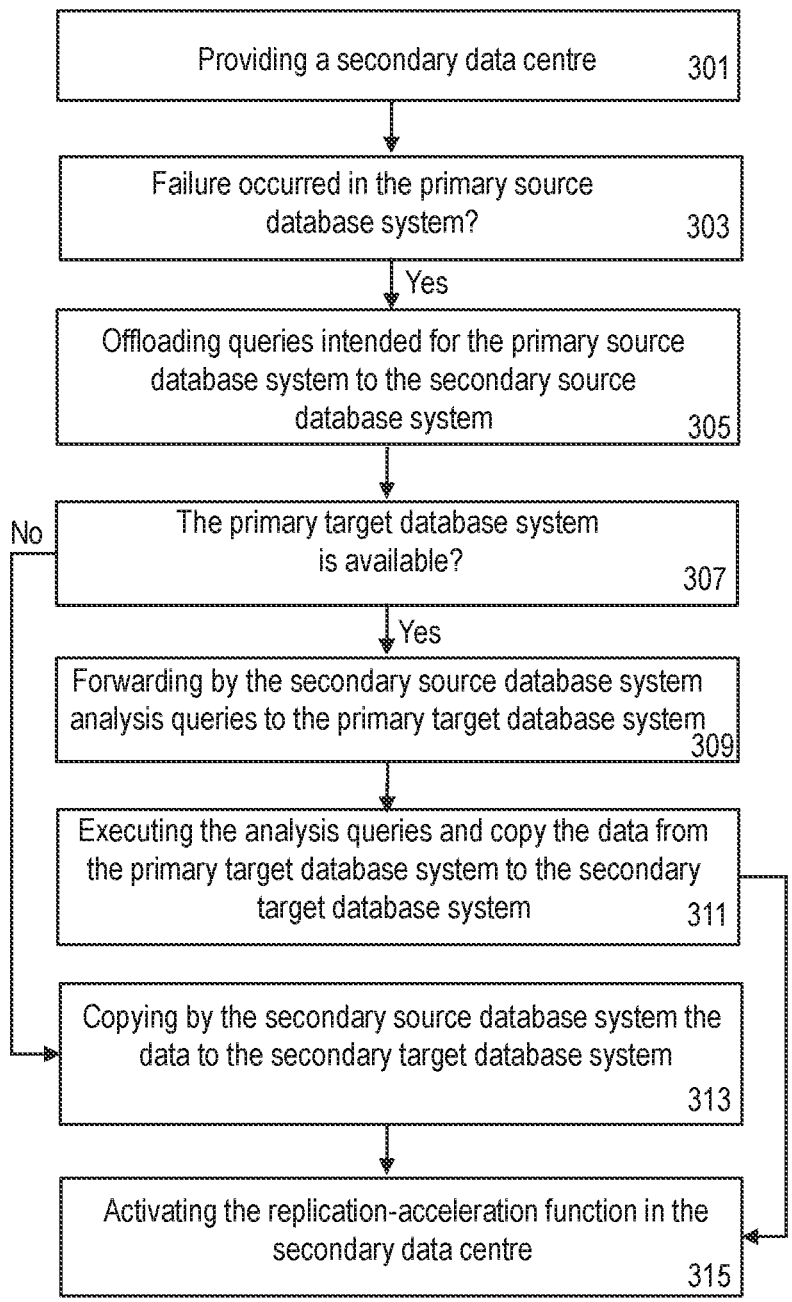
FIG. 3 is a flowchart of an approach for operating a data center, in accordance with an embodiment of the invention.

FIG. 3 is a flowchart of an approach for operating a data center (named primary data center) in accordance with an example of the present subject matter. For the purpose of explanation, the approach described in FIG. 3 may be implemented in the system illustrated in FIG. 1 or 2, but is not limited to such an implementation. The primary data center may, for example, be data center 100 or 200A, described with reference to FIG. 1 and FIG. 2, respectively.

A secondary data center 200B, e.g., as described with reference to FIG. 2, may be provided in step 301. The secondary data center may enable a disaster recovery center for the primary data center 200A. The secondary data center 200B may be connected to the primary data center 200A via one or more connections. The connections may, for example, comprise FCP links and/or Fibre Connection (FICON) links.

A process may determine, in step 303, whether a failure is occurred in the primary source database system 201A. The failure may, for example, be a failure of the disk subsystem 207A of the primary source database system 201A.

In response to detecting a failure in the primary source database system 201A, a process may offload queries intended for the primary source database system 201A, in step 305, to the secondary source database system 201B. At the time t0 when the failure is occurred the storages 207A, 227A and 207B may be in a consistent state and may comprise a same data named DSO which may be a most recent data of the primary source database system 201A. The data consistency on the storages may be ensured by, for example, monitoring and checking by the owner/administrator, the operations in the primary and secondary data centers. The data DSO may be the most recent data of the primary source database system 201A right before the failure is detected at the primary source database system 201A.

A process may determine, in step 307, whether the primary target database system 221A is available. The system being available means that the system can receive and execute queries.

If the primary target database system 221A is available and upon receiving offloaded queries by the secondary source database system 201B, the secondary source database system 201B may identify, in the offloaded queries analysis, queries (complex queries) and forward, in step 309, the analysis queries to the primary target database system 221A. The primary target database system 221A may execute the analysis queries and copy the data DSO, in step 311, from the primary target database system 221A to the secondary target database system 221B. The copying of the data DSO and the execution of the analysis queries, in step 311, may be performed in parallel or concurrently. Copying the data DSO may make the DR accelerator 221B ready for query acceleration. This may enable the primary target database system 221A for query acceleration until the DR accelerator 221B is ready for query acceleration. Copying the data from the primary target database system 221A may be advantageous. For example, for re-syncing the DR accelerator, data may be copied directly from the primary accelerator instead of the recovering database system 201B, as the data is still available and its replication recovery metadata (e.g., bookmark table) is in sync with the recovery state of the database (only committed transactions are replicated).

If the primary target database system 221A is not available, the secondary source database system 201B may copy, in step 313, the data DSO to the secondary target database system 221B.

After the copying of the data DSO is ended, the replication-acceleration function may be activated (e.g., at time t1), in step 315, in the secondary data center 200B. This means that after time t1, the replication from the secondary source database system 201B to the secondary target database system 221B may be performed and the analysis queries may be executed in the secondary target database system 221B. The replication may be performed so that changes to the data DSO that occurred between t0 and t1 may be applied at the secondary target database system 221B. For example, after activating the secondary data center 200B, those changes that occurred between t0 and t1 may be propagated to the secondary accelerator 221B. For example, between t0 and t1, there may be a time point T0 that marks the availability of the Db2/z Mainframe of the secondary data center 200B. From t0 to T0, the time can be very short, may be just minutes or even seconds if all done automatically, neither the mainframe Db2 on the primary data center, nor the mainframe Db2 on the secondary data center may be available. There may be no data written to the secondary Db2 z/OS system from t0 to T0. From T0 to t1, data can be written to the secondary Db2 z/OS system. The changes will be written to the secondary Db2/z, and this data will be replicated to the secondary accelerator after t1.

The copy of the data from the primary target database system 221A to the secondary target database system 221B may have the following steps: identifying tables to be copied on the primary target database system 221A and initiate the copy process to the secondary target database system 221B, copying the replication metadata that identifies the log positions until when exactly data was replicated from the primary source database system 201A, changing the DR db2 z/OS system and DR accelerator into read/write mode after the recovery is completed, and restarting replication on the DR db2 z/OS system and DR accelerator to continue replication of any new changes after failover and recovery completed. The DR db2 z/OS system and DR accelerator may switch into read/write mode because the recovery procedure is done. The DR accelerator has been protected up to now from write activities, but since the data on the DR accelerator is now up to date, the mode can be set to read/write to continue with the rest of the work (replication of any newly changed data from db2, and query workload). Switching into read/write mode marks the completeness of the whole data recovery procedure.

Figure 4:
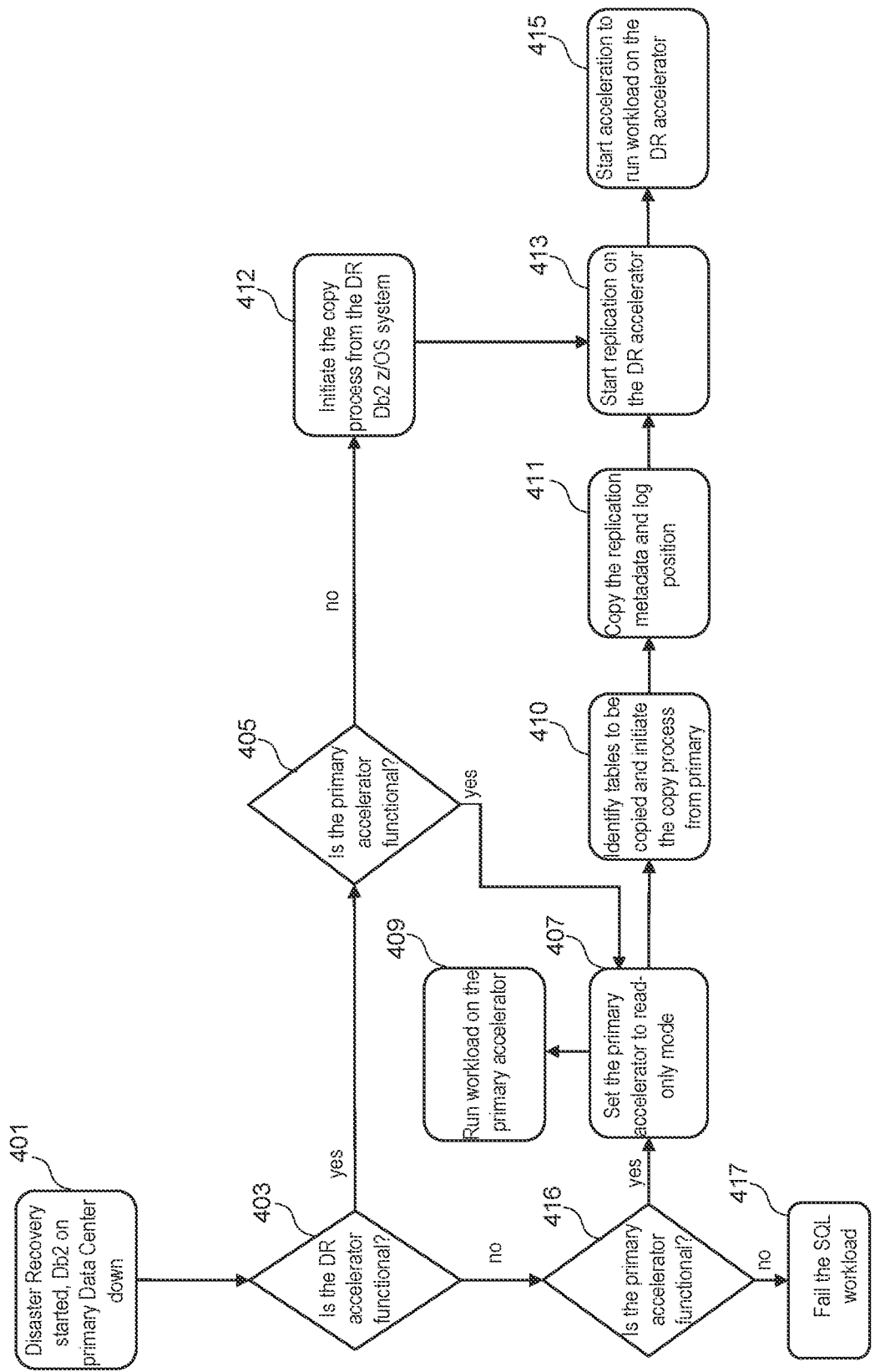
FIG. 4 is a flowchart of a recovery approach, in accordance with an embodiment of the invention.

FIG. 4 is a flowchart of a recovery approach in accordance with an example of the present subject matter. For the purpose of explanation, the approach described in FIG. 4 may be implemented in the system illustrated in FIG. 2, but is not limited to such an implementation.

A disaster recovery may start in step 401 because the Db2 on the primary data center 200A is down. A process may determine, in step 403, whether the DR accelerator 221B is functional. In case the DR accelerator 221B is functional, a process may perform steps 405-415, otherwise, a process may perform steps 407-411, 413-415 and 416-417. A process may determine, in step 405, whether the primary accelerator 221A is functional. If a process determines that the primary accelerator is functional, a process may perform steps 407, 409-411, 413 and 415, otherwise, a process may perform steps 412-413 and 415. As used herein, "not functional" means that the DR accelerator does not yet have the data the DR accelerator needs to run workloads. The DR accelerator may be, for example, functional after preparing and copying the data from the primary accelerator to the secondary accelerator.

A process may set the primary accelerator for read-only mode in step 407. In step, 409, a process may run the workload on the primary accelerator. In step 410, a process may identify tables to be copied and, in step 411, the primary accelerator 221A may initiate the copy process for the DR accelerator 221B. In step 411, a process may identify the tables so that table contents may be copied, and copy of the operating system images, the configurations and setup of the machine may be prevented, e.g., because the operating system, network setups, default configurations may already be available on the secondary accelerator. The primary accelerator 221A may further copy replication metadata indicating log positions to the DR accelerator 221B in step 411. After is the copy is completed, a process may start the replication on the DR accelerator in step 413 and a process may start the acceleration in step 415 in order to run workload on the DR accelerator 221B.

In step 412, a process initiates the copy of the data from the DR Db2 z/OS system 201A to the DR accelerator 221B, and thereafter a process performs steps 413 and 415.

In step 416, a process may determine whether the primary accelerator 221A is functional. If a process determines that the primary accelerator 221A is functional, a process performs steps 407, 409-411, 413, and 415. If a process determines that the primary is not functional, the workload may fail in step 417 as none of the accelerators is functional.

Thus, FIG. 4 describes the flow of events triggered for recovering the failure of the primary Db2 for z/OS system 201A. As described above, the flow starts at the event of Db2 being detected unresponsive at the primary data center. This causes fail-over of Db2 to the DR z/OS system 201B, and, once this system 201B has completed start-up and recovered to a consistent state from the transaction logs of the primary, will initiate the search for an accelerator to be used. If the DR Accelerator and the primary accelerator are still available, the primary accelerator can be used directly for acceleration, and in parallel, the copy process can start directly from the primary accelerator. This works because only committed changes are replicated and the primary accelerator is in a consistent state at or before the state of changes of the DR Db2 z/OS system 201B. Upon completion of the copy, replication can pick up from the latest copied commit from the DR Db2 z/OS system 201B. If the DR Accelerator 221B is not functional but the primary accelerator 221A is, the primary accelerator 221A will be put into read-only mode and query acceleration from the DR Db2 z/OS system 201B may happen right-away. In parallel, the copy process from the primary accelerator 221A to the DR Accelerator 221B may be initiated to be able to restart replication and query acceleration once completed. Lastly, if the primary accelerator 221A is not functional but the DR accelerator 221B is, data may be copied from the DR Db2 z/OS system 201B to the DR accelerator 221B and query acceleration may not happen until this copy process is complete.

The present subject matter comprises the following clauses.

Clause 1. A computer-implemented method comprising: providing a primary data center, the primary data center comprising a primary source database system and a primary target database system, wherein a function is activated in the primary data center causing the primary target database system to: comprise a copy of data of the primary source database system; receive analysis queries from the primary source database system; and execute the analysis queries on the data; in response to detecting a failure in the primary source database system: offloading queries intended for the primary source database system to a secondary source database system, the secondary source database system of a secondary data center further comprising a secondary target database system, the secondary source database system comprising a copy of the data, wherein the function is deactivated in the secondary data center; responsive to the primary target database system being available: receiving, by the primary target database system, analysis queries, processed by the secondary source database system, of the offloaded queries; and copying, by the primary target database system, the data to the secondary target database system; and causing the function to be activated in the secondary data center.

Clause 2. The computer-implemented method of clause 1, further comprising setting the primary target database system to a read only mode before executing the analysis queries at the primary target database system.

Clause 3. The computer-implemented method of clause 1 or 2, further comprising sending, from the primary target database system to the secondary target database system, log positions until a time when the data was replicated from the primary source database system to the primary target database system, wherein the log positions are used for replicating further changes that occurred at the secondary source database system after the failure.

Clause 4. The computer-implemented method of clause 3, the log positions sent in replication metadata of the primary target database system.

Clause 5. The computer-implemented method of any of the preceding clauses 1 to 4, wherein the failure is a failure of a disk subsystem of the primary source database system.

Clause 6. The computer-implemented method of any of the preceding clauses 1 to 5, wherein the primary source database system actively mirrors storage of the primary source database system to storage of the secondary source database system such that the secondary source database system comprises the copy of the data.

Clause 7. The computer-implemented method of any of the preceding clauses 1 to 6, wherein copying the data to the secondary target database system is performed in parallel to executing the analysis queries.

Clause 8. The computer-implemented method of any of the preceding clauses 1 to 7, wherein causing the function to be activated in the secondary data center comprises changing the primary source database system into a read/write mode.

Clause 9. The computer-implemented method of any of the preceding clauses 1 to 8, wherein the primary source database system is an online transaction processing (OLTP) system and the primary target database system is an online analytical processing (OLAP) system.

Clause 10. The computer-implemented method of any of the preceding clauses 1 to 8, wherein the secondary source database system is an online transaction processing (OLTP) system and the secondary target database system is an online analytical processing (OLAP) system.

Clause 11. The computer-implemented method of any of the preceding clauses 1 to 10, wherein: the primary data center is connected to the secondary data center through one or more links; and the link comprises a selection from the group consisting of: a Fibre Channel Protocol (FCP) link and a Fibre Connection (FICON) link.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:
1. A computer-implemented method comprising:
providing a primary data center, the primary data center comprising a primary source database system and a primary target database system, wherein a function is activated in the primary data center causing the primary target database system to:
  comprise a copy of data of the primary source database system;
  receive analysis queries from the primary source database system; and
  execute the analysis queries on the data; and
in response to detecting a failure in the primary source database system:
  offloading queries intended for the primary source database system to a secondary source database system, the secondary source database system of a secondary data center further comprising a secondary target database system, the secondary source database system comprising a copy of the data, wherein the function is deactivated in the secondary data center;
  responsive to the primary target database system being available:
    receiving, by the primary target database system, analysis queries, processed by the secondary source database system, of the offloaded queries; and
    copying, by the primary target database system, the data to the secondary target database system; and
  causing the function to be activated in the secondary data center.

2. The computer-implemented method of claim 1, further comprising setting the primary target database system to a read only mode before executing the analysis queries at the primary target database system.

3. The computer-implemented method of claim 1, further comprising:
  sending, from the primary target database system to the secondary target database system, log positions until a time when the data was replicated from the primary source database system to the primary target database system, wherein the log positions are used for replicating further changes that occurred at the secondary source database system after the failure.

4. The computer-implemented method of claim 3, wherein the log positions are sent in replication metadata of the primary target database system.

5. The computer-implemented method of claim 1, wherein the failure is a failure of a disk subsystem of the primary source database system.

6. The computer-implemented method of claim 1, wherein the primary source database system actively mirrors storage of the primary source database system to storage of the secondary source database system such that the secondary source database system comprises the copy of the data.

7. The computer-implemented method of claim 1, wherein copying the data to the secondary target database system is performed in parallel to executing the analysis queries.

8. The computer-implemented method of claim 1, wherein causing the function to be activated in the secondary data center comprises changing the primary source database system into a read/write mode.

9. The computer-implemented method of claim 1, wherein the primary source database system is an online transaction processing (OLTP) system and the primary target database system is an online analytical processing (OLAP) system.

10. The computer-implemented method of claim 1, wherein the secondary source database system is an online transaction processing (OLTP) system and the secondary target database system is an online analytical processing (OLAP) system.

11. The computer-implemented method of claim 1, wherein:
  the primary data center is connected to the secondary data center through one or more links and a first link of the one or more links is of a type selected from the group consisting of: a Fibre Channel Protocol (FCP) link and a Fibre Connection (FICON) link.

12. A computer program product comprising:
  one or more computer readable storage media, and program instructions collectively stored on the one or more computer readable storage media, the program instructions comprising:
  program instructions to provide a primary data center, the primary data center comprising a primary source database system and a primary target database system, wherein a function is activated in the primary data center causing the primary target database system to:
    comprise a copy of data of the primary source database system;
    receive analysis queries from the primary source database system; and
    execute the analysis queries on the data; and
  program instructions to, in response to detecting a failure in the primary source database system:
    offload queries intended for the primary source database system to a secondary source database system, the secondary source database system of a secondary data center further comprising a secondary target database system, the secondary source database system comprising a copy of the data, wherein the function is deactivated in the secondary data center;
    responsive to the primary target database system being available:
      receive, by the primary target database system, analysis queries, processed by the secondary source database system, of the offloaded queries; and
      copy, by the primary target database system, the data to the secondary target database system; and
    cause the function to be activated in the secondary data center.

13. The computer program product of claim 12, further comprising program instructions, collectively stored on the one or more computer readable storage media, to set the primary target database system to a read only mode before executing the analysis queries at the primary target database system.

14. The computer program product of claim 12, further comprising:
  program instructions, collectively stored on the one or more computer readable storage media, to send, from the primary target database system to the secondary target database system, log positions until a time when the data was replicated from the primary source database system to the primary target database system, wherein the log positions are used for replicating further changes that occurred at the secondary source database system after the failure.

15. The computer program product of claim 14, wherein the log positions are sent in replication metadata of the primary target database system.

16. The computer program product of claim 12, wherein the failure is a failure of a disk subsystem of the primary source database system.

17. The computer program product of claim 12, wherein the primary source database system actively mirrors storage of the primary source database system to storage of the secondary source database system such that the secondary source database system comprises the copy of the data.

18. The computer program product of claim 12, wherein copying the data to the secondary target database system is performed in parallel to executing the analysis queries.

19. The computer program product of claim 12, wherein program instructions to cause the function to be activated in the secondary data center comprise program instructions to change the primary source database system into a read/write mode.

20. A computer system comprising:
one or more computer processors, one or more computer readable storage media, and program instructions collectively stored on the one or more computer readable storage media for execution by at least one of the one or more computer processors, the program instructions comprising:
program instructions to provide a primary data center, the primary data center comprising a primary source database system and a primary target database system, wherein a function is activated in the primary data center causing the primary target database system to:
comprise a copy of data of the primary source database system;
receive analysis queries from the primary source database system; and
execute the analysis queries on the data; and
program instructions to, in response to detecting a failure in the primary source database system:
offload queries intended for the primary source database system to a secondary source database system, the secondary source database system of a secondary data center further comprising a secondary target database system, the secondary source database system comprising a copy of the data, wherein the function is deactivated in the secondary data center;
responsive to the primary target database system being available:
receive, by the primary target database system, analysis queries, processed by the secondary source database system, of the offloaded queries; and
copy, by the primary target database system, the data to the secondary target database system; and
cause the function to be activated in the secondary data center.

* * * * *